Nov. 10, 1970   G. DARRIEUS   3,539,817
ROTARY ELECTRIC MACHINE WITH ROTOR IN THE FORM OF A DISC
Filed Jan. 17, 1969                                              2 Sheets-Sheet 1
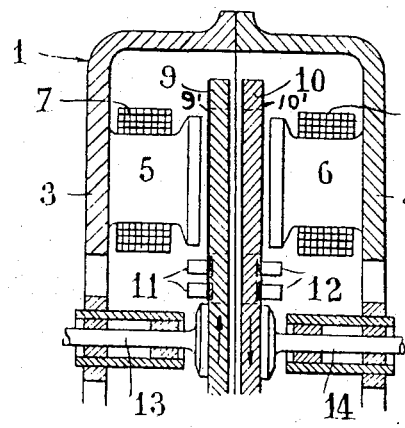
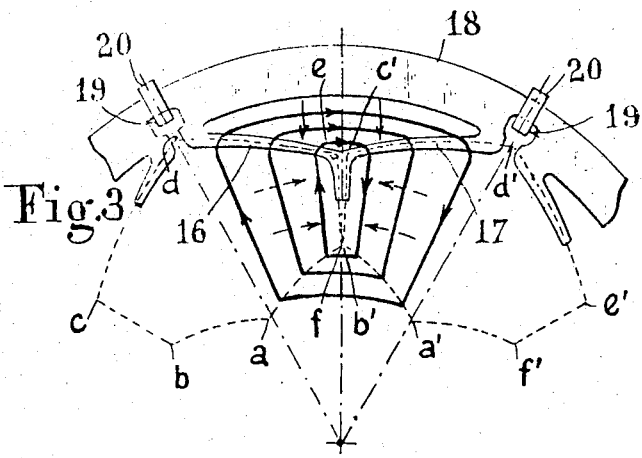
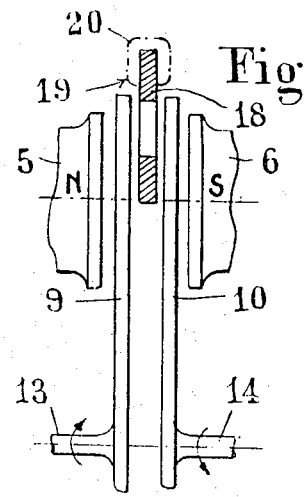
Inventor
Georges Darrieus
By Pierce, Scheffler & Parker
Attorneys

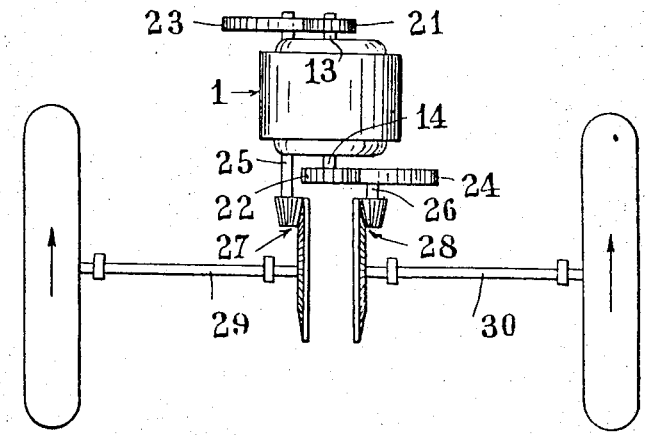
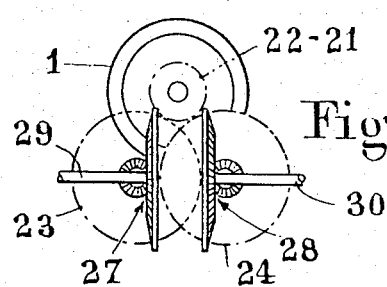
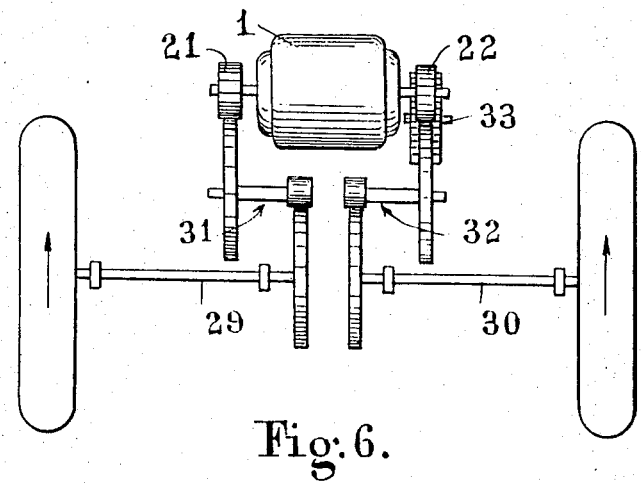

United States Patent Office 3,539,817
Patented Nov. 10, 1970

3,539,817
ROTARY ELECTRIC MACHINE WITH ROTOR IN THE FORM OF A DISC
Georges Darrieus, Houilles, France, assignor to Compagnie Electro-Mecanique, Paris, France, a body corporate
Filed Jan. 17, 1969, Ser. No. 792,029
Claims priority, application France, Jan. 29, 1968, 137,796
Int. Cl. B60l *11/00;* H02k *23/54*
U.S. Cl. 290—9                                 5 Claims

ABSTRACT OF THE DISCLOSURE

A rotary electrical machine of the axial air-gap type includes a pair of stator elements each comprising a cup-like casing containing a ring of circumferentially spaced poles alternating in polarity and between which a pair of co-axially mounted disc-type armatures are arranged for rotation in opposite directions to supply a load. The respective windings on the armature discs are energized by equivalent currents but of opposite sign thereby to develop, through opposition of their ampere-turns, a mutual compensation of the armature reaction with respect to the external magnetic circuit through the casing and poles.

---

This invention relates to rotary dynamo-electric machinery of the commutator type such as electrical motors and generators and is particularly concerned with such machines of the axial air gap type which utilize an armature in the form of a disc, the windings being applied to opposite faces of the disc and being interconnected in the required manner dependent upon the type of winding utilized. Due to the use of a disc type rotor, the electrical machine has a relatively short axial length as compared with electrical machines in which the rotor is essentially of a drum configuration and the air gap extends in a radial direction, and accordingly is usually referred to as being of the "flat" type.

Various improvements made in the use of materials employed in these so-called "flat" machines as well as in their construction have made them quite practical for various applications, and particularly for use as the power plant for driving a traction machine such as an automobile or other similar wheeled vehicle.

In accordance with the present invention, the rotary electrical machine of the so-called "flat" type is characterized by the fact that it contains, in the same axial air gap, two co-axially mounted armatures in disc form which rotate counter to each other and wherein the respective windings on the armature discs are energized by equivalent currents of opposite sign. Hence, the two armatures share in the motor, or generator, function with each one contributing to half of its total power by producing, through the opposite position of their ampere turns, perfect compensation of the armature reaction with respect to the external magnetic circuit.

This result which, in machines of high power with difficult commutation or which must operate within a wide range of speeds by weakening the field (shunting the inductors in the traction engines) is customarily sought in the use of a compensation winding distributed over the poles, is completely and naturally achieved by the action of the directly usable members (armatures) alone, without the aid of any supplementary winding.

Hence, there is a saving in the cost, the space occupied and the losses involved in the case of this winding, the elimination of which permits a reduction in the length of the inductor poles, while at the same time, it results in the disappearance of the additional reluctance ascribable to the corresponding slotted section.

Furthermore, the compensation of the armature reaction avoids any alteration in the inductor field which, both under load and at rest, retains a uniform distribution over the entire smooth surface of the pole shoe, and prevents any possible manifestations of instability which, in the case of high-speed engines, accompany the field distortion.

Bringing together the two layers of current with opposite signs forming the two armatures has the effect of practically limiting the field itself of the armature to the volume only of these windings, as well as to the space which separates them, in the form of two tangential fluxes, each of which covers half of the surface of the discs and which face each other at right angles to each of the interpole lines.

Various forms of embodiment of the present invention will be described hereinbelow, by way of non-limitative examples and with reference to the accompanying drawing wherein:

FIG. 1 is a half-view in axial cross-section of a flat motor with two disc-shaped armatures according to the invention;

FIG. 2 is a half-view in axial section of a variation in the embodiment of the flat motor;

FIG. 3 is a partial diagrammatic cross-sectional view showing the principle of the operation of the motor of FIG. 2;

FIG. 4 is a diagrammatic plan view showing the use of the motor according to the invention for the traction of a motor vehicle;

FIG. 5 is a diagrammatic view in elevation of the driving device shown in FIG. 4; and FIG. 6 is a plan view of a variation in the embodiment of a driving device for a motor vehicle, using the engine according to the invention.

With reference now to FIG. 1, the "flat" motor which is illustrated in section in FIG. 1 comprises a stator constructed from two elements forming a continuous magnetic circuit for return of the magnetic flux after passing from the magnetic poles through the rotary armature. Each element of the stator is constituted by a cup shaped housing 3, 4, each of which contains a ring of circumferentially spaced poles 5, 6 around the axis of the motor and alternating in polarity. Excitation windings 7 are provided on the poles 5 and excitation windings 8 are similarly provided on the poles 6. Oppositely positioned poles have opposite polarity as indicated in FIG. 2. The housings 3, 4 are secured together so that the poles 5 and 6 confront one another and establish between them an axial gap within which are mounted, in accordance with the invention, two armatures 9 and 10 having the configuration of a disc. Each disc is provided with windings 9', 10' on each face thereof and which are interconnected together to form a circuit for current flow. These windings have not been illustrated in detail since their construction and arrangement are well known. Winding 9' is energized by commutator brushes 11, and winding 10' is similarly energized by commutator brushes 12.

The disc-shaped armatures 9 and 10 are arranged side-by-side but non-touching in the air gap between the field poles 5 and 6. These armatures form an integral part of shafts 13 and 14, respectively, rotating counterwise in bearings carried by the supporting shields 3 and 4.

The windings are fed by the brush-units 11 and 12 with the same current of opposite signs, so that they share in the motor or alternatively a generating function, with each contributing half of the total power. As a result of the opposition of their ampere-turns, perfect compensation of the armature reaction is obtained with respect to the external magnetic circuit.

The reactance voltage, which is already especially weak in flat motors due to the absence of iron in the rotor, is even further reduced in the present case, thereby increasing the known advantages of excellent commutation in this type of machine.

If, however, it becomes necessary in larger machines, or in order to compensate for the eventual introduction of a magnetic material in the rotor which would be advantageous from the viewpoint of excitation, to have special devices such as commutation poles intended to maintain at zero for any load the variation of the flux of magnetic induction due to the armature current through the sections in commutation, the machine forming the object of the present invention lends itself particularly well to this strict perfecting of the compensation.

To achieve this, it is sufficient to provide, in the zones of commutation along the lines where the opposing magnetomotive forces resulting from the reversal in the current of one layer to the other meet, elements of magnetic circuitry designed to prevent the formation of subsequent poles and leakage into the air of the fluxes arriving there; these elements will continue, according to a suitable path, to channel the flux outside of the armature winding, particularly outside of the sections in commutation; this would already be ensured, in the areas covered by the fields, by the mutual compensation of the two layers of current.

The main principle on which are based the arrangement and form of these magnetic elements is that they must ensure the connection between the field sections with a naturally more or less uniform structure which each of the elements in the layers of current tends to produce, thereby rendering compatible the conditions at the respective limits.

An application of this principle will now be made, with reference to FIGS. 2 and 3, showing the same elements as those in FIG. 1 and which are designated by the same reference numbers.

In FIG. 3, the contours *abcdefa*, *a'b'c'd'e'f'a'*, etc. represent the winding coils on the armature in commutation.

If abstraction is made of the small internal flux limited to between the two layers of the winding, where, as along the evolutes, the layers of current are in a discordant state, the unit of two layers in proximity composing each armature is practically equivalent, with respect to the exernal effect, to a single resultant layer in which the distribution of the current lines, in conformity with that of the end connections called "concentric," corresponds to the path indicated by the solid line arrows in FIG. 2.

To this distribution of the current there corresponds a leakage field in the space between the two armatures which, if it is assumed that this is confined to said space and that it is therefore proportional at every point to the linear density of the corresponding current in both layers of current, displays the arrangement shown by the dotted arrows.

Starting from its outer extremity, this leakage field is continued and bifurcates between the two curved elements 16 and 17 which along the path of the development of the winding sections in commutation, lead to the perimeter of the rotor disc, in addition to the portion (half) of the flux transmitted by the radial element, that of the same sign with which the total flux progressively increases along the developed windings.

On the periphery, elements in the form of ring-shaped segments, such as 18, collect the totality of radial fluxes so as to carry these from pole to pole.

In order to maintain along the developed elements such as 16 and 17, not only the preservation of the flux, but also that of the local magnetic potentials of each partial field, it is also necessary to surround these elements, disposed obliquely to the field, with a solenoid, the current distribution on which, while compensating for the external M.M.F. gradient, renders compatible the variable external potential with the uniform value of the internal potential of the iron.

On the other hand, as in the conventional machines with commutation poles, the outer ring through which the flux resulting from leakage can be provided with additional ampere-turns formed by coils 19, with an eventual return to the ring 20, so as to improve, despite the leakages due to the intermediate reluctances, the maintainence of the total natural flux of the armature only inside of the inner space limited to the two rotors, without any portion of the flux passing through the winding sections in commutation, where some electromotive force is developed in rotation.

It has been stated above, in order to simplify, that the leakage fluxes are channeled, half toward the exterior and half toward the interior of a circumference of average radius.

In the case where the largest measured space available internally would render difficult the installation of elements such as that corresponding to the ring 18, the partial fluxes of the elements such as those which, along *fa* or *a'b'*, can be directed toward the exterior thereby relieving the inner circuit.

The combination of arrangements described hereinabove can provide, in an even more satisfactory manner than in the case of the traditional compensatory winding, a theoretically perfect solution of commutation under any load, either constant or rapidly variable, without any manifestation of induced current in the outer space.

In practice, various compromises will make it possible to disregard, in whole or in part, refinements which are theoretically useful, without going beyond the scope of the invention.

For example, the compensation of the reactance voltage may be effected by conventional commutating poles disposed between main poles on both sides of the pair of discs, and whose action although limited to the more or less radial portion of the commutating sections, and weakened by the opposition of these auxiliary poles will suffice nevertheless to assure the compensation of the reactance voltage which moreover is weak itself for a disc type armature.

For its contemplated application to automotive traction, the single drive for a pair of wheels can be disposed with its axis either in a crosswise (FIGS. 4 and 5) or longitudinal position (FIG. 6), relative to the axis of the drive axles.

In the case of FIGS. 4 and 5, the shafts 13 and 14 of the motor 1 form an integral part, at their outer extremities, with pinions 21 and 22, respectively, engaging with gear wheels 23 and 24 secured to intermediate shafts 25, 26. These shafts, in turn, drive in rotation by means of pairs of bevel pinion gear sets 27 and 28 universal cross shafts 29 and 30, thereby ensuring the reduction in speed and the drive on independent wheels on the same axle.

In the driving arrangement shown in FIG. 6, in which the motor 1 is disposed with a transverse axis, the pinions 21 and 22 drive in rotation the cross shafts 29 and 30 by means of reducing gear trains with spur pinions, indicated as a unit by 31 and 32. In this case, to obtain uniformity in the sense of rotation of the independent wheels, one of the reducing units, in this case the gear train 32, contains a supplementary reversing pinion 33.

It is understood, moreover, that the various forms of embodiments of the invention hereinabove described, and with reference to the annexed drawing, have been given solely by way of example, and that numerous modifications can be made in them without thereby going beyond the scope of the present invention.

I claim:

1. In a rotary electrical machine of the axial air gap type, the combination of a pair of oppositely disposed stator casing elements, each said stator casing element including a ring of circumferentially spaced poles alternating in polarity, and a pair of co-axially mounted disc type armatures provided with windings thereon and located in the space between said rings of poles and arranged in spaced relation for rotation in opposite directions, the said windings on said armatures being energized with equal currents of opposite sign thereby to develop, through opposition of their ampere-turns, a mutual compensation of the armature reaction with respect to the external magnetic circuit through said casing elements and poles.

2. A rotary electrical machine as defined in claim 1 and which further includes magnetic circuit elements in the space between said armature discs, said magnetic circuit elements being located along the windings of the armature discs in commutation and collecting the various elements of the leakage flux so as to prevent its effects on the windings in commutation.

3. A rotary electrical machine as defined in claim 1 and which constitutes a traction engine for a motor vehicle, each of said armature discs being secured to and driving separate shafts coupled respectively by speed reducing gear trains to wheel driving axles on the motor vehicle.

4. A rotary electrical machine as defined in claim 3 wherein the shafts secured to and driven by said armature discs are disposed normal to the axis of the drive axles, and each said gear train includes two speed reducing couples so as to obtain a symmetrical drive, for example, by shafts with universal joints of the two wheels on the drive axles.

5. A rotary electrical machine as defined in claim 3 wherein the shafts secured to and driven by said armature discs are disposed parallel to the axis of the drive axles and each gear train comprises pairs of meshed pinion-gear sets and with one of said gear trains including an additional intermediate reversing pinion.

References Cited

FOREIGN PATENTS 192,309   11/1964   Sweden.

ORIS L. RADER, Primary Examiner

W. E. DUNCANSON, JR., Assistant Examiner

U.S. Cl. X.R.

290—45; 310—268